UNITED STATES PATENT OFFICE.

ALEXANDRE DE LODYGUINE, OF PARIS, FRANCE.

MANUFACTURE OF INCANDESCENTS.

SPECIFICATION forming part of Letters Patent No. 347,164, dated August 10, 1886.

Application filed June 2, 1886. Serial No. 203,950. (No specimens.) Patented in Belgium February 5, 1885, No. 67,768; in Germany February 17, 1885, No. 34,203; in France June 8, 1885, No. 169,430, and in England June 13, 1885, No. 7,222.

*To all whom it may concern:*

Be it known that I, ALEXANDRE DE LODYGUINE, a citizen of Prussia, residing at Paris, in the Department of the Seine, France, have invented new and useful Improvements in the Manufacture of Carbons for Electric Lamps and other Purposes, (for which I have obtained a patent in Belgium, No. 67,768, bearing date February 5, 1885; in Germany, No. 34,203, bearing date February 17, 1885; in France, No. 169,430, bearing date June 8, 1885; in England, No. 7,222, bearing date June 13, 1885,) of which the following is a specification.

This invention has for its object the production of carbons for electric lamps and other like apparatus; and it consists in the use of fluoride of boron and its derivatives for the purpose of dehydrating organic substances which contain the elements of water chemically combined therewith. The object of this treatment is to obtain carbons suitable for use in electrical apparatus, and particularly in incandescent lamps.

In carrying out my invention the organic substance is brought to the desired form, being, for instance, divided into filaments, and is then subjected to the action of fluoride of boron, ($BFl_3$.) The reaction takes place while the substances are cold, and therefore it is not necessary to raise the temperature. After this treatment the substance is subjected to a high temperature with exclusion of air and oxygen, to eliminate the fluoride of boron in excess, as well as the combinations which it may form. This operation may be conducted in any ordinary or suitable way, as in a closed muffle or retort, the heat being derived from a furnace, from an electric current, or otherwise. The carbon thus prepared is impregnated with a carburet of hydrogen—such as sugar or glucose, or analogous substance containing in combination the elements of water, ($C^m H^{2n} O^n$.) After this the carbon is again treated with fluoride of boron and acted upon by heat, as before, and these operations are repeated until the required density and conductivity are attained.

Having thus described my invention, what I claim is—

In the manufacture of carbons for electric lamps and other purposes from organic substances containing the elements of water, the improvement consisting in treating said organic substance with fluoride of boron, substantially as described.

In testimony whereof I have signed this specification in the presence of two subscribing witnesses.

ALEXANDRE DE LODYGUINE.

Witnesses:
EMILE CANDEROS,
F. O. JOTT.